Patented May 11, 1937

2,080,262

UNITED STATES PATENT OFFICE 2,080,262

GLASS COMPOSITION

Kitsuzo Fuwa and Fujio Suzuki, Tokyo, Japan, assignors to General Electric Company, a corporation of New York No Drawing. Application September 14, 1936, Serial No. 100,791. In Japan September 21, 1935

2 Claims. (Cl. 106—36.1)

The present invention comprises new glass compositions and its object is to provide compositions which are less subject to contamination by carbon and sulphur during fusion and which are more readily melted and cleaned.

One of the features of novelty of glass compositions embodying our invention is the presence in boro-silicate glass of zinc oxide, preferably less than one per cent.

A glass embodying our invention comprises more than 77.5 per cent of silica, about 0.5 to 3.5 per cent of aluminum oxide and 0.5 to 2.0 per cent of an alkali carbonate, such as potassium carbonate, the total alkali content being less than 5.5 per cent.

Such a glass will withstand rapid changes of temperature, is chemically resistive and has superior electrical properties. However, owing to the proportion of silica and the high total alkali content, it is too refractory to be easily worked. When heated in an open pot or tank furnace in direct contact with the flame, it reacts with carbon and sulphur and becomes contaminated.

In accordance with our present invention, these defects are completely removed by adding about from 0.1 to 1 per cent of zinc oxide to the metals composing the glass mixture. The following is a typical glass batch:

| | Per cent |
|---|---|
| Silica ($SiO_2$) | 81.0 |
| Aluminum oxide ($Al_2O_3$) | 3.0 |
| Potassium oxide ($K_2O$) | 1.0 |
| Sodium oxide ($Na_2O$) | 1.5 |
| Boric anhydride ($B_2O_2$) | 13.0 |
| Zinc oxide (ZnO) | 0.5 |

Such a mixture can be melted in an open pot and heated directly by gas flame without contamination and without any adverse effect on its heat resisting, chemical and electrical characteristics.

What we claim as new and desire to secure by Letters Patent of the United States is:

1. A glass composition having a silica content of more than 77.5 per cent, an alkali oxide content of less than 5.5 per cent and a zinc oxide content of more than 0.1 and less than one per cent.

2. A glass composition having a content of silica of more than 77.5 per cent, a content of alumina of 0.5 to 3.5 per cent, a content of alkali of less than 5.5 per cent and a content of about one-half per cent of zinc oxide.

KITSUZO FUWA.
FUJIO SUZUKI.